Patented Sept. 4, 1934

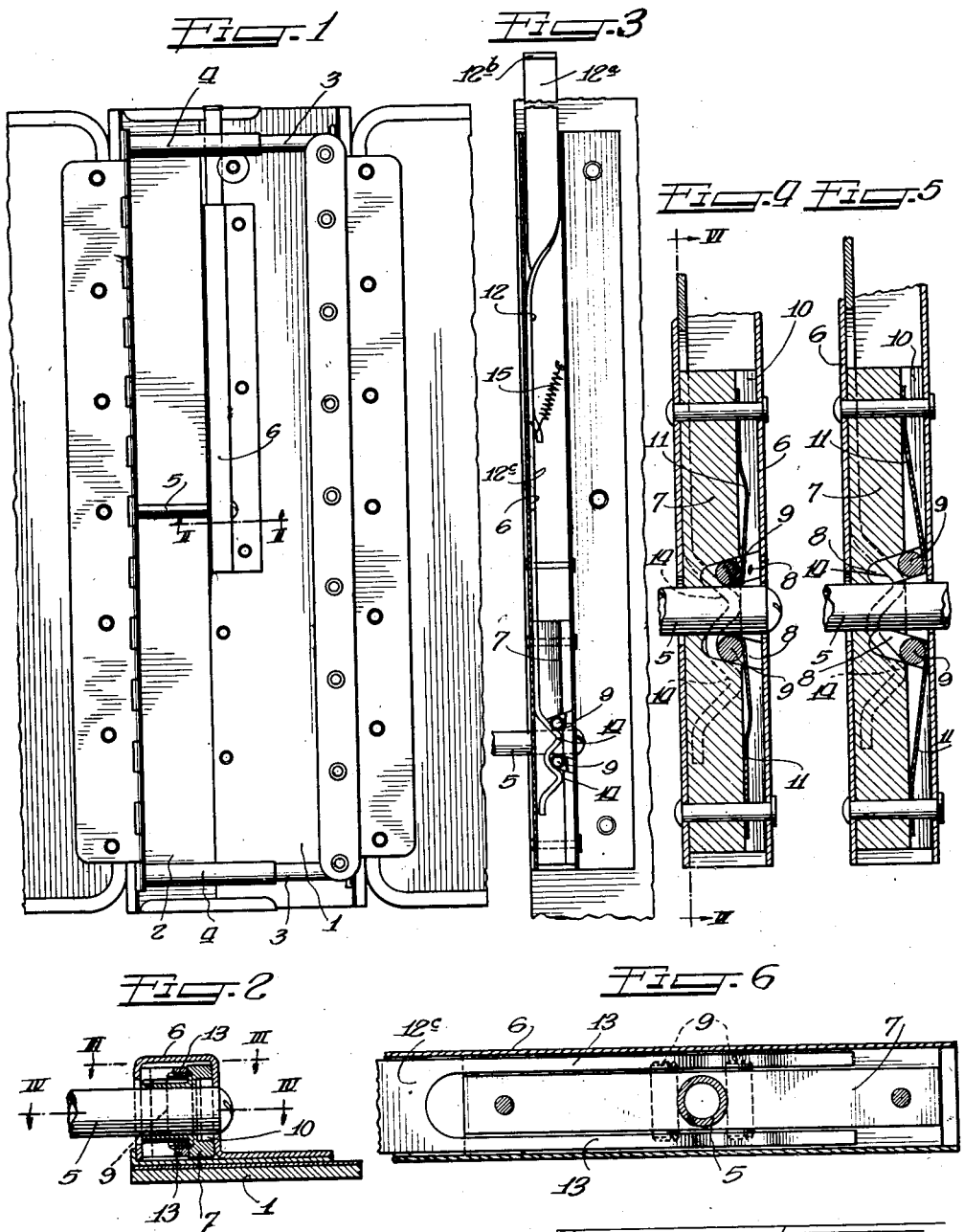

1,972,417

UNITED STATES PATENT OFFICE 1,972,417

LOCKING MECHANISM FOR BINDERS

Hugh G. Buchan, Philadelphia, Pa.

Application November 18, 1931, Serial No. 575,724

2 Claims. (Cl. 129—13)

This invention relates to locking mechanism for binders and concerns itself with frictional locking elements that are manually shifted to unlocking position and that are automatically shifted to locking position when disengaged by the manually operated member.

The invention comprises the novel structure and combinations of parts hereinafter described and more particularly pointed out and defined in the appended claims.

In the accompanying drawing which illustrates a preferred form of this invention, and in which similar reference numerals refer to similar features in the different views:

Figure 1 is a fragmentary interior plan view of a binder equipped with locking mechanism involving this invention.

Figure 2 is an enlarged fragmentary sectional view taken upon the line II—II of Figure 1 looking in the direction of the arrow.

Figure 3 is an enlarged sectional view taken upon the line III—III of Figure 2 looking downwardly.

Figure 4 is an enlarged fragmentary sectional view taken upon the line IV—IV of Figure 2 looking in the direction of the arrow.

Figure 5 is a view similar to Figure 4 but illustrating the frictional locking element in unlocked position.

Figure 6 is a fragmentary view taken upon the line VI—VI of Figure 4 showing the interior part in elevation with parts in section.

In the illustrated embodiment of this invention as shown in the drawing, it will be observed that the binder consists of a pair of relatively slidable members 1 and 2. The member 1 is provided with the horizontally extending guide rods 3 that telescope in tubular members 4 which are carried by the member 2. According to this construction, the binder can be readily expanded or contracted as desired. This invention concerns itself primarily with mechanism for locking the two binder halves together and to this end a locking post 5 extends from the member 2 and passes through a lock casing 6 which is carried upon the bottom of the member 1.

Within the lock casing 6 there is a bearing 7 which has an aperture through which the locking post extends. Adjacent the aperture in bearing 7 there are a pair of diverging slots 8 as clearly shown in Figures 4 and 5.

A frictional element 9 in the form of a roller is located in each slot 8. The bearing block is cut away against the side wall of the casing as indicated at 10 and the free end of a leaf spring 11 bears against each roller 9. The far ends of these leaf springs 11 are secured to the bearing within the recess formed by the cutaway portion.

The leaf springs 11 normally urge the rollers 9 into the converging portions of the slots 8 and into frictional binding relation with the locking post 5.

Mechanism is provided for shifting the rollers 9 toward the diverging portions of the slots 8 and out of frictional locking engagement with the locking post 5. This mechanism consists of a slide bar 12 having a flat end 12ª which projects beyond one end of the casing 6 and is provided with a finger piece 12ᵇ whereby the same may be manually operated. From the flat portion 12ª, the slide bar is twisted so as to lie closely adjacent a side wall of the casing, as indicated at 12ᶜ. The forward end of the slide bar consists of a pair of forks or tine members 13 as shown in Figure 6 which straddle the bearing 7 and extend against the rollers 9. The slide 12 is provided with a pair of spaced ribs 14 which are adapted for engaging the rollers 9 and shifting the same into the diverging portions of the slots 8 against the tension of the springs 11 when the slide bar 12 is shifted outwardly by the operator. The unlocking position of the rollers 9 is shown in Figure 5 and it will be noted that they are held in their unlocked position by the ribs 14 on the slide. When the slide is pushed inwardly to disengage the rollers, the springs 11 will urge the rollers up into the converging portions of the slots and into frictional engagement with the locking post 5. It will be noted that in the locking position of the rollers 9, one rib 14 of the slide will be located between the two rollers and the other rib 14 of the slide will be positioned beyond the rollers.

In order to prevent the slide bar 12 from idly shifting or rattling, it is yieldingly anchored to the casing by means of a light coil spring 15 which has merely sufficient force to hold the slide and the ribs thereof against the rollers, as shown in Figure 3.

From the foregoing, it will be appreciated that a novel form of locking mechanism has been provided for an expansible binder. It is unnecessary to manipulate the binder as in the case of a gravity lock that is commonly used. According to the present invention, it is only necessary to slide the bar 12 a short distance and this may be accomplished in any position of the binder.

I am aware that many changes may be made and numerous details of construction may be varied through a wide range without departing from the principles of this invention, and I therefore do not purpose limiting the patent granted hereon otherwise than is necessitated by the prior art.

I claim as my invention:

1. As an article of manufacture a loose leaf binder consisting of a pair of vertically adjustable members of angular cross section overlapped along one of the said angle arms with the inner of said overlapping arms being so formed and positioned that its upper edge will in the extreme closed position of the binder contact with the inner face of the non-overlapping arm of the other of said adjustable members for supporting the same against rotatable motion in a vertical plane, the overlapping arm of each of the said adjustable members constituting the back element of the said binder and the other arm of each of the said adjustable members constituting the cover elements for the said binder, a lock casing having an aperture formed therein attached to the upper edge of the inner of said overlapping arms at a point substantially midway between its ends, a bearing secured in said casing and having formed therein an aperture in registry with the aperture in said casing and two diverging slots extending from said aperture, a round locking post carried by the cover element of the other of the said adjustable members and positioned so as to extend through the said casing and bearing apertures, friction elements comprising rollers positioned one in each of said slots, yielding means positioned in said casing for normally urging the said frictional elements into engagement with the said post, and a slide having bifurcated arms straddling said bearing and located in said casing, said arms each having ribs positioned for engaging said frictional elements, said slide having a portion parallel to one side of said casing and a portion parallel to the adjacent side of said casing, said last mentioned portion extending beyond the binder and being provided with a handle.

2. As an article of manufacture a loose leaf binder consisting of a pair of vertically adjustable members of angular cross section overlapped along one of the said angle arms with the inner of said overlapping arms being so formed and positioned that its upper edge will in the extreme closed position of the binder contact with the inner face of the non-overlapping arm of the other of said adjustable members for supporting the same against rotatable motion in a vertical plane, the overlapping arm of each of the said adjustable members constituting the back element of the said binder and the other arm of each of the said adjustable members constituting the cover elements for the said binder, a lock casing having an aperture formed therein attached to the upper edge of the inner of said overlapping arms at a point substantially midway between its ends, a bearing secured in said casing and having formed therein an aperture in registry with the aperture in said casing and two diverging slots extending from said aperture, a round locking post carried by the cover element of the other of the said adjustable members and positioned so as to extend through the said casing and bearing apertures, rollers one positioned in each of the said slots, yielding means positioned in said casing for normally urging the said rollers into engagement with the said post and a slide having ribs for engaging the said rollers, said slide having an end portion twisted in a plane perpendicular to the other portion and extending beyond the said casing and terminating in an operating handle.

HUGH G. BUCHAN.